C. A. SMITH.
AUTOMOBILE STARTER.
APPLICATION FILED JUNE 10, 1913.
1,128,911.
Patented Feb. 16, 1915.
2 SHEETS—SHEET 1.
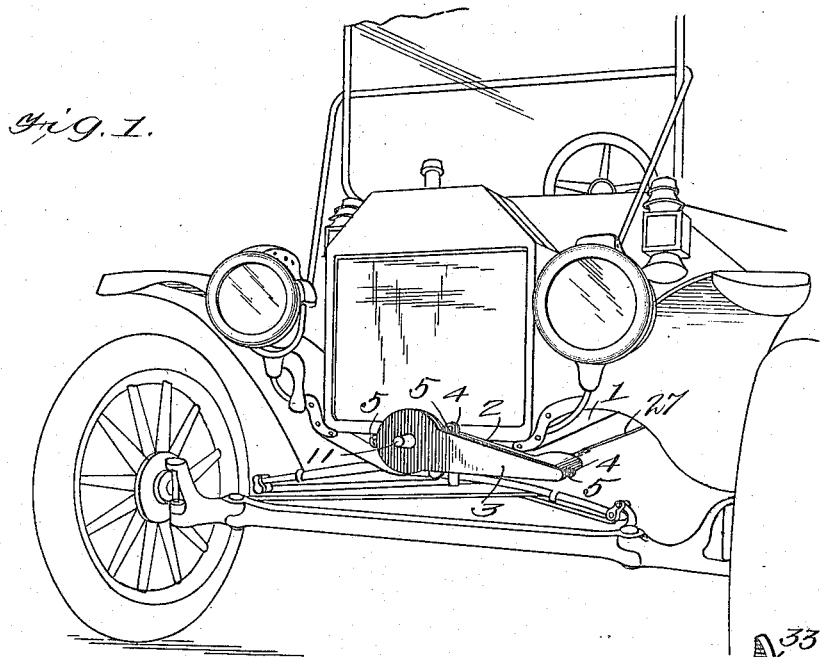
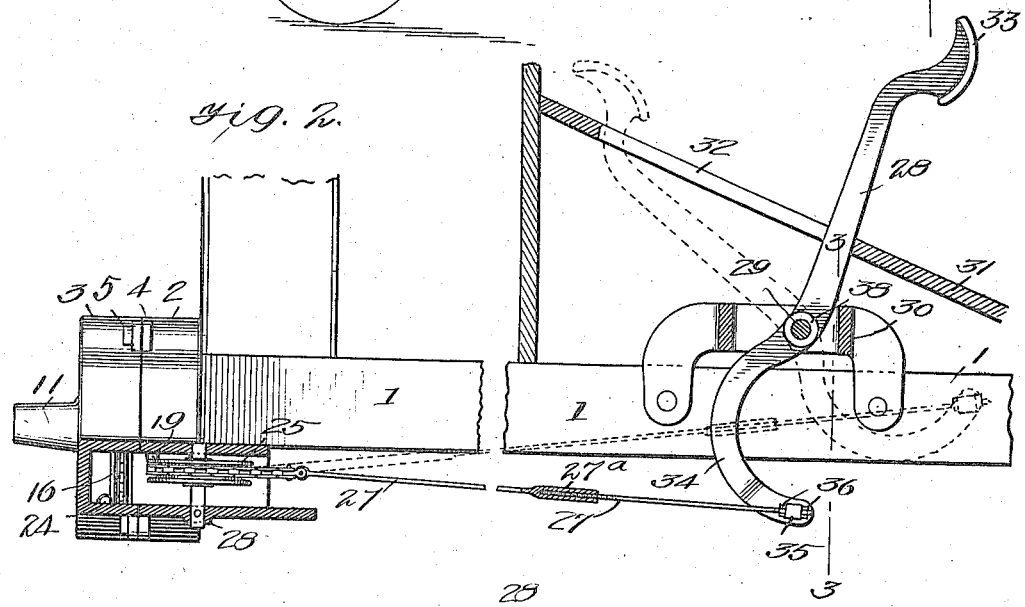
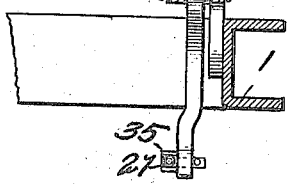
WITNESSES
INVENTOR
Charles A. Smith
BY
ATTORNEYS

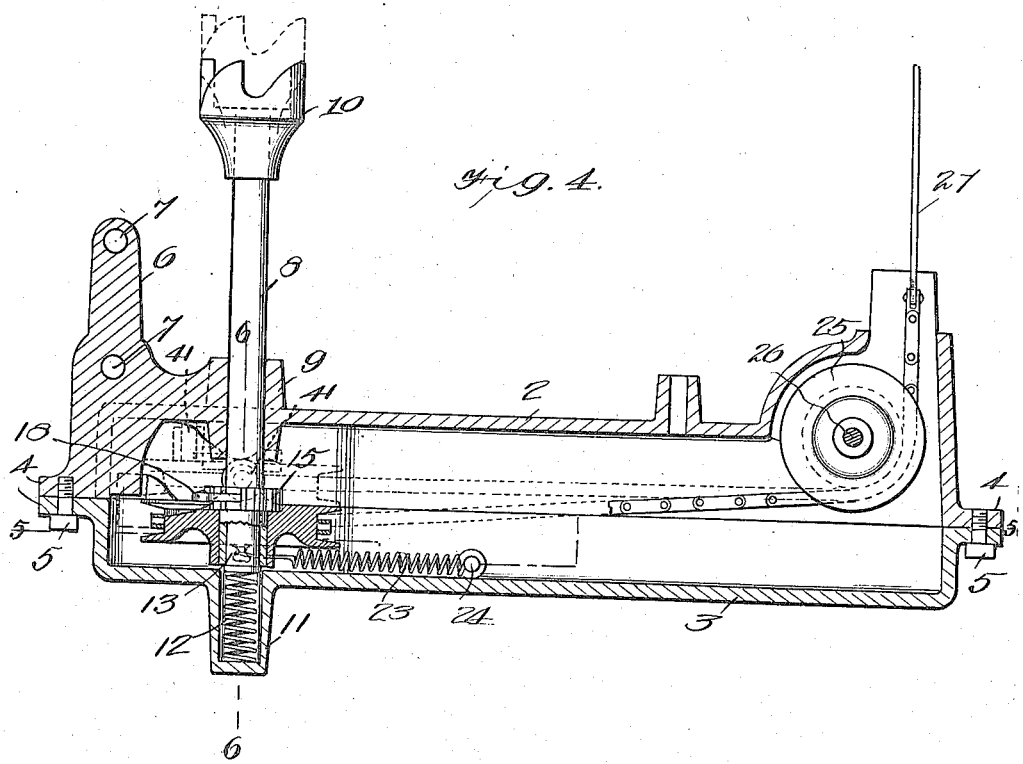
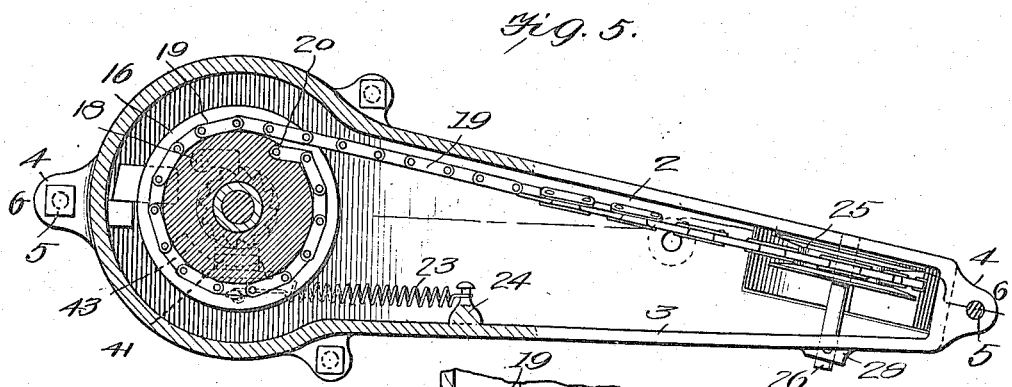
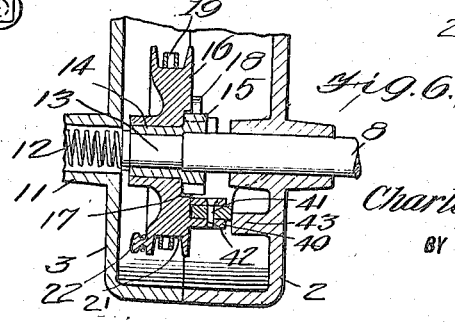

UNITED STATES PATENT OFFICE.

CHARLES ALVAH SMITH, OF BRATTLEBORO, VERMONT.

AUTOMOBILE-STARTER.

1,128,911.                Specification of Letters Patent.        Patented Feb. 16, 1915.

Application filed June 10, 1913. Serial No. 772,761.

*To all whom it may concern:*

Be it known that I, CHARLES A. SMITH, a citizen of the United States, and a resident of Brattleboro, in the county of Windham and State of Vermont, have invented a new and useful Improvement in Automobile-Starters, of which the following is a specification.

My invention is an improvement in automobile starters, and has for its object to provide a starter of the character specified, especially adapted for use in automobiles, and wherein mechanism is connected with the engine shaft for rotating the same in a forward direction, capable of being operated by the driver from his seat, without the necessity of dismounting, by a movement of the foot, and so arranged that there will be no interference with the engine after it has started.

In the drawings: Figure 1 is a perspective view of the front end of an automobile provided with the improvement, Fig. 2 is a partial longitudinal section of the automobile, Fig. 3 is a section on the line 3—3 of Fig. 2, Fig. 4 is a section on the line 4—4 of Fig. 5, Figs. 5 and 6 are sections on the lines 5—5 and 6—6 respectively, of Fig. 4.

The present embodiment of the invention is shown in connection with the frame 1 of an automobile, and comprises a sectional casing consisting of an inner section 2 and an outer section 3, each section having registering perforated lugs 4, from which are passed bolts 5 for securing the sections together. The inner section is provided with an arm 6, extending inward, and lapping on the upper face of the forward end of the frame of the automobile, and the said arm is provided with openings 7 for permitting the arm to be secured to the said frame.

A shaft 8 is journaled transversely of the casing at the end adjacent to the arm in a bearing 9, in the inner section 2 of the casing, the said bearing being extended beyond both faces of the wall of the casing as shown to provide a rigid bearing for the said shaft. The shaft is longitudinally movable in the bearing, and is provided at its inner end with one section 10 of a clutch, the said clutch section being adapted to engage a similar section on the engine shaft, not shown. The clutch is so arranged that when the shaft 8 is rotated in a direction to move the engine forwardly, the clutch sections will engage each other, while when the engine shaft is moved forwardly, the teeth of the clutch section move idly over each other.

The outer sections 3 of the casing is provided with a tubular extension 11, in alinement with the opening of the bearing 9, and a coil spring 12 is seated in the extension, the said spring bearing at one end against the closed end of the extension and at the other against the end of the shaft 8. The spring acts normally to move the shaft toward the engine shaft. It will be noted from an inspection of Fig. 6 that the end of the shaft adjacent to the spring 12 is reduced annularly as indicated at 13, and a bushing 14 is threaded on the said reduced portion, the bushing having at its inner end an annular rib provided with an annular series of ratchet teeth 15.

A sprocket wheel 16 is seated on the bushing, the inner face of the said wheel being recessed as indicated at 17 to receive the ratchet wheel, and a pawl 18 is pivoted to the inner face of the sprocket wheel, the said pawl engaging the teeth of the ratchet wheel 15. A sprocket chain 19 winds upon the sprocket wheel, one end of the said sprocket chain being secured to the wheel as indicated at 20. It will be noticed that the sprocket wheel is grooved annularly as shown at 21, and the sprocket chain is arranged within the groove. The groove is of sufficient depth to receive one turn of the chain as will be evident from an inspection of Fig. 5. The wheel is also provided with a wrist pin 22, at its periphery, and a coil spring 23 has one of its ends secured to the wrist pin, the opposite end being connected with a headed pin 24, on the inner section 2 of the casing. The spring 23 is connected with the wheel at the opposite side from the connection 20 of the sprocket chain, and the spring acts against the pull of the chain on the wheel. The opposite end of the sprocket chain passes over a pulley 25, journaled on a shaft 26, arranged at the opposite end of the casing from the sprocket wheel, and the said opposite end of the chain is connected to a link 27. The shaft 26 of the pulley 25 is held in bearings 28, in the section 2 of the casing, and the opposite end of the link 27 from the chain is connected to the lower end of a lever 28.

The lever 28 is pivoted at 29 to a bracket 30, on the frame of the car, below the foot board 31, and the said foot board has a slot 32, through which the upper end of the lever extends. The said upper end is provided with a foot plate or treadle, and the said treadle or foot plate is in position to be engaged by the foot of the driver. The lower end of the lever is arched or curved as shown at 34, the convexity of the curve being forward, and the link is made in sections, one section having a socket 27ᵃ into which the adjacent end of the other section is threaded. The other end of the said section is passed through a bearing lug 35 on the lever, and is engaged by nuts 36 on opposite sides of the said bearing lug. The length of the link may be varied by means of the said connection. The bracket 30 is cored as shown, and the lever is passed through the slot or cored out opening, and the pivot pin 29 is passed through the lever and the bracket at the sides of the cored out portion. Cotter pins 39 are passed through the ends of the pivot pin 29 to prevent longitudinal movement thereof and to hold the lever in place. The arrangement of the bracket supports the pivot pins on both sides of the lever.

The shaft 8 represents the ordinary crank for cranking the engine and the sprocket wheel 16 is provided on its inner face with two laterally extending lugs 40, and a roller 41 is journaled between the lugs on a pin 42. A cam 43 is provided on the inner surface of the casing section 2, the said cam being integral with the said casing. When the roller 41 engages the cam 43, the shaft 8 is moved longitudinally away from the engine shaft to cause the clutch section 10 to disengage with the clutch section on the engine shaft.

In use, the spring 23 holds the shaft 8 in the position shown in Fig. 5, and the cam 43 engaging the roller 41, holds the shaft 8 in the full line position of Fig. 4. When it is desired to crank the automobile, the lever 28 is moved into the dotted line position of Fig. 2, thus making traction on the chain 19, and rotating the shaft 8 in a direction to move the engine forwardly. The first movement of the wheel 16 causes the roller 41 to disengage from the cam 43, the said roller passing off the highest portion of the cam, and the spring 12 immediately moves the shaft 8 longitudinally into the dotted line position of Fig. 4, to cause the clutch section to engage with the similar section on the engine shaft. The continued movement of the shaft 8 turns the engine over and starts the same. At no time is more than a partial rotation necessary, and at the end of each partial rotation of the shaft 8, the spring 23 returns the sprocket wheel to normal position as indicated by full lines in Fig. 4. At the end of the movement of the shaft 8, the roller 41 has passed upon the highest part of the cam 43, thus moving the shaft 8 into the full line position of Fig. 4 and out of engagement with the engine shaft. The spring 23 returns the sprocket wheel 16 to its original position without affecting the movement of the shaft 8, since the pawl 18 slips idly over the teeth of the ratchet wheel when the sprocket wheels move in the reverse direction. The sprocket wheel 16 only carries the shaft 8 therewith when the said sprocket wheel is moving forwardly. The shaft 8 is normally out of engagement with the engine shaft, held so by the engagement of the roller 41 with the cam 43. The sprocket chain is given a quarter turn between the pulley 25 and the sprocket wheel 16. The ratchet wheel 15 is keyed or otherwise secured to the shaft 8, and the sprocket wheel 16 is journaled loosely on the said ratchet wheel. The roller 41 in the inoperative position of the device is at the highest point of the cam just ready to roll off the said cam, and the first movement of the sprocket wheel causes the roller to disengage from the cam. As soon as the roller rolls off of the cam, the spring 12 which is under compression, moves the shaft 8 inwardly and longitudinally to cause it to engage with the engine shaft. A lug 44 is provided on the sprocket wheel and engages a stop 45 in the casing, to normally hold the sprocket wheel in the position of Fig. 5. The spring 23 holds the wheel in this position, and the stop and the lug limit the return movement of the sprocket wheel, under the influence of the spring 23. In case of a premature explosion in the engine, causing the engine to "back fire," the engine shaft is merely disengaged from the crank without any damage to any of the parts. When the engine back-fires, the shaft 8 is merely pushed longitudinally away from the engine shaft, causing the clutch section 10 to disengage from the section on the engine shaft. Should the starting shaft 8 be carried rearwardly with the engine shaft, the engagement of the roller 41 with the cam 43 would insure the disengagement of the shafts, by moving the shaft 8 longitudinally.

This improvement while it has a more general application is especially designed for use on what is known in the trade as the Model T Ford car, and it is only necessary to drill a single hole in the frame of the said car and a slot in the foot board for the lever 28.

I claim:—

1. In an automobile the combination with the engine, of a starting device therefor, comprising a casing adapted for connection with the frame of the automobile, a shaft journaled in the casing and extending through the same and having at the end thereof a clutch section for engaging a similar section on the engine shaft, said shaft being movable longitudinally, a spring normally pressing the shaft toward the engine shaft, a ratchet wheel rigid with the shaft, a sprocket wheel journaled loosely on the shaft, a pawl on the sprocket wheel and engaging the ratchet wheel to constrain the shaft to rotate with the sprocket wheel when the said wheel is moved in a direction to start the engine, a chain winding on the sprocket wheel, a lever pivoted adjacent to the seat of the automobile and having a treadle for engagement by the foot of the driver, a connection between the lever and the chain for unwinding the chain to move the sprocket wheel in a direction to start the engine when the upper end of the lever is moved away from the driver, a spring in connection with the sprocket wheel for returning the said wheel to its original position, a roller on the sprocket wheel and a cam on the casing for engagement by the roller to move the shaft longitudinally away from the engine shaft to compress the first-named spring, a stop in the casing and a lug on the wheel for engaging the stop to limit the return movement of the sprocket wheel to a position where the roller is at the highest point of the cam and where the further movement of the sprocket wheel in a forward direction will move the roller out of engagement with the cam.

2. In an automobile, the combination with the engine, of a starting device therefor, comprising a casing having means whereby it may be connected with the frame of the automobile, a starting shaft journaled in the casing and movable longitudinally with respect thereto, and having a clutch section for engaging a similar section on the engine shaft to move the engine shaft in a direction to start the engine and to permit the engine shaft to move forwardly without interference from the said starting shaft, a spring normally pressing the starting shaft toward the engine shaft, a sprocket wheel journaled loosely on the starting shaft, means in connection with the sprocket wheel and the starting shaft for constraining the starting shaft to move with the sprocket wheel when the said wheel is rotated in a direction to start the engine, a chain winding on the sprocket wheel, a treadle arranged adjacent to the seat of the automobile for engagement by the foot of the driver to swing the treadle, a connection between the treadle and the chain for unwinding the same to move the sprocket wheel forwardly when the treadle is swung from the driver, a spring for returning the sprocket wheel to its original position, a roller on the sprocket wheel and a cam on the casing for engagement by the roller to move the starting shaft away from the engine shaft, a stop in the casing, and a lug on the sprocket wheel for engaging the stop to limit the return movement of the sprocket wheel to a position where the roller is at the highest point of the cam and where the further movement of the sprocket wheel will cause the roller to disengage the cam to permit the first-named spring to move the starting shaft longitudinally toward the engine shaft.

3. In an automobile, the combination with the engine, of a starting device therefor, comprising a casing having means whereby it may be connected with the frame of the automobile, a starting shaft journaled in the casing and movable longitudinally with respect thereto, and having a clutch section for engaging a similar section on the engine shaft to move the engine shaft in a direction to start the engine and to permit the engine shaft to move forwardly without interference from the said starting shaft, a spring normally pressing the starting shaft toward the engine shaft, a sprocket wheel journaled loosely on the starting shaft, means in connection with the sprocket wheel and the starting shaft for constraining the starting shaft to move with the sprocket wheel when the said wheel is rotated in a direction to start the engine, a chain winding on the sprocket wheel, a treadle arranged adjacent to the seat of the automobile for engagement by the foot of the driver to swing the treadle, a connection between the treadle and the chain for unwinding the same to move the sprocket wheel forwardly when the treadle is swung from the driver, a spring for returning the sprocket wheel to its original position, a roller on the sprocket wheel and a cam on the casing for engagement by the roller to move the starting shaft away from the engine shaft, and means for holding the sprocket wheel with the roller at the highest point of the cam and in position to disengage the roller when the sprocket wheel is again moved forwardly.

CHARLES ALVAH SMITH.

Witnesses:
M. MACDONALD,
E. J. WATERMAN.